A. F. SHORE.
PICTURE DISPLAY MACHINE.
APPLICATION FILED APR. 22, 1919.
1,331,284.
Patented Feb. 17, 1920.
2 SHEETS—SHEET 1.
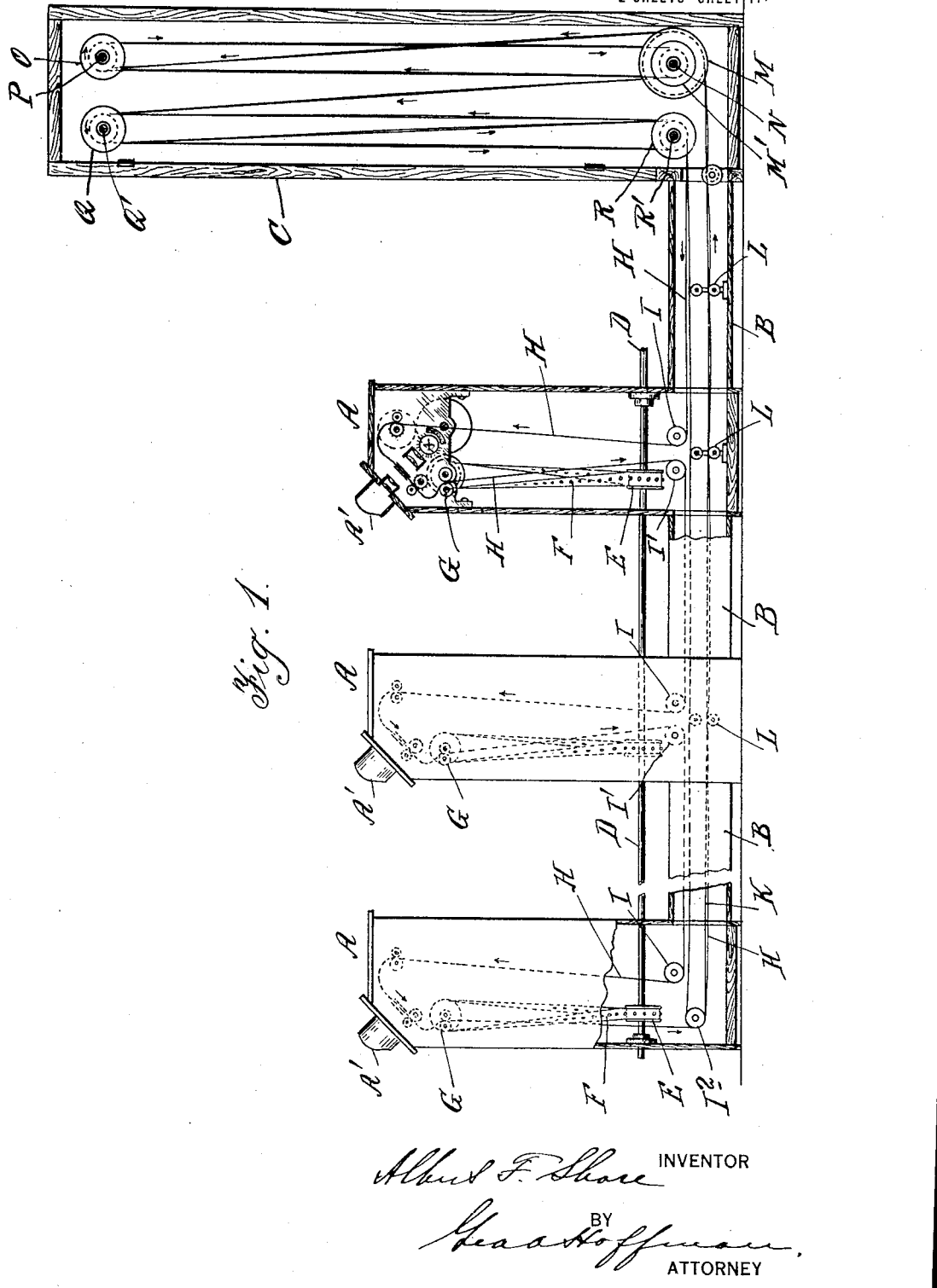
INVENTOR
Albert F. Shore
BY
Geo. Hoffman
ATTORNEY

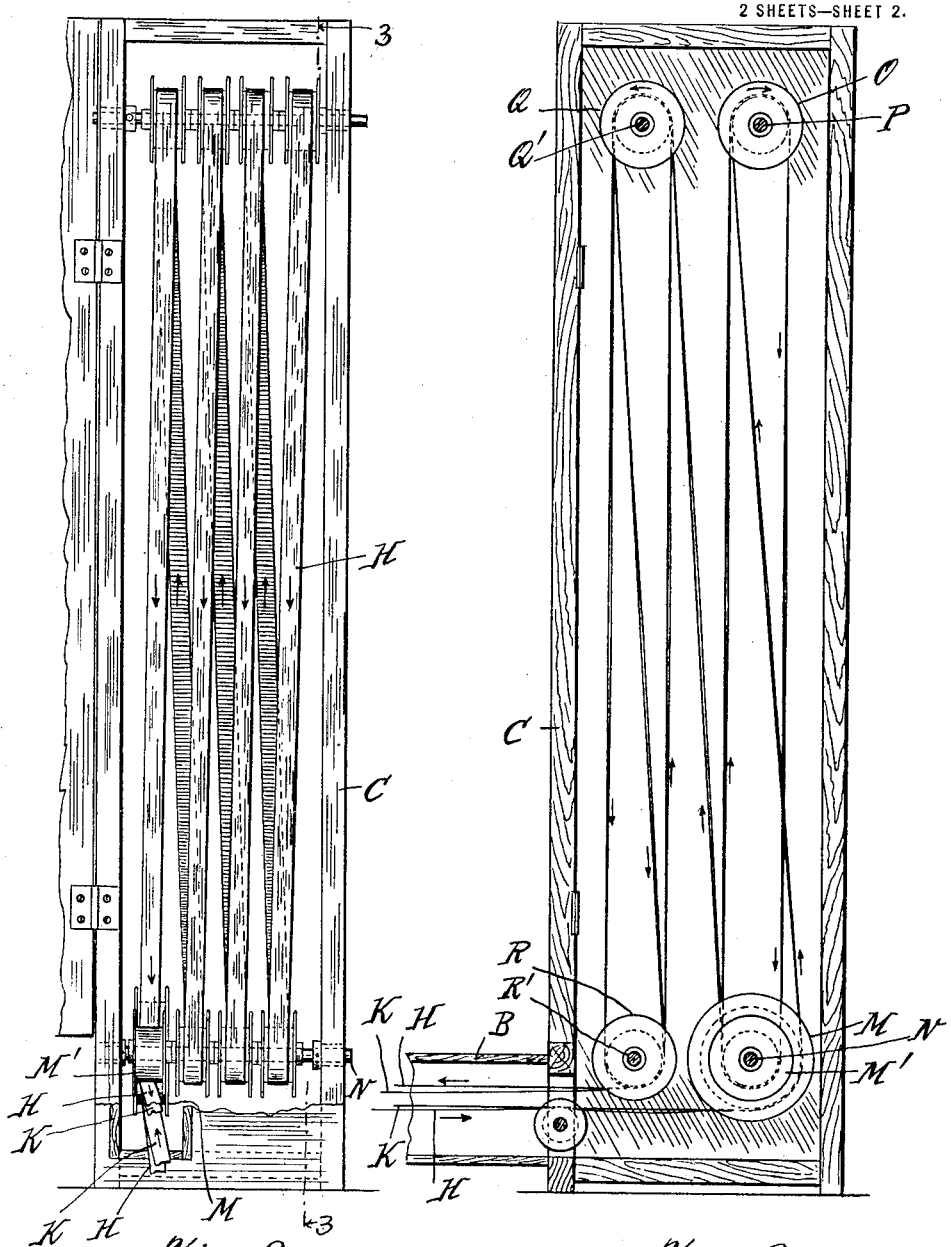

UNITED STATES PATENT OFFICE.

ALBERT F. SHORE, OF NEW YORK, N. Y.

PICTURE-DISPLAY MACHINE.

1,331,284.   Specification of Letters Patent.   Patented Feb. 17, 1920.

Application filed April 22, 1919. Serial No. 291,825.

*To all whom it may concern:*

Be it known that I, ALBERT F. SHORE, a citizen of the United States, residing at New York, in the county of New York and State of New York, have invented certain new and useful Improvements in Picture-Display Machines, of which the following is a full, clear, and exact specification.

This invention relates to picture-display machines, more particularly to an arrangement of this kind in which coin-controlled mechanism is used to display the pictures to individual persons. It is the object of my invention to provide a simple and efficient apparatus of this kind, by means of which a set of consecutive pictures can be viewed by a number of persons in different viewing apparatuses, almost at the same time, without requiring a separate set of pictures for each individual viewing apparatus. Another object of my invention is to provide a simple way of storing the film or band of pictures while the viewing apparatus is not being used. Other objects and advantages of my invention will appear from the description following hereinafter, and the novel features will be pointed out in the appended claims.

One form of carrying out my invention has been shown in the accompanying drawings, in which Figure 1 is a side elevation, with parts in section, of a number of display devices or individual viewing apparatuses and of a picture or film storage cabinet or housing connected therewith; Fig. 2 is a front view of the film storage cabinet, with its cover or door swung open, and Fig. 3 is a vertical section through said cabinet, taken on line 3—3 of Fig. 2.

In Fig. 1, A represents three of a series of individual viewing devices, in the form of cabinets, having sight openings A' through which the pictures can be viewed, it being understood that only one person at a time can view the pictures displayed in any one of these devices. These viewing devices are arranged, as shown, one behind the other, and are connected at their lower portions by a conduit B which also leads to a picture-storage cabinet or housing C. A shaft D extends through the viewing apparatuses, and carries pulleys E, one inside of each apparatus. A belt F, preferably perforated, in each of the machines A, serves to transmit the motion of the shaft D to the intermittent film-feeding mechanism G arranged in each apparatus A, which mechanism may be of any approved construction, and has therefore only been indicated diagrammatically. The film H enters the viewing apparatus located nearest the cabinet C from the conduit B, by passing over a roller I up to the feeding mechanism G, where it can be viewed from the sight openings A', a lamp provided with the usual reflecting mirror, condensing lenses, etc., illuminating the picture in each apparatus. The film then travels down over a roller I' into conduit C in which it reaches the second viewing apparatus over roller I, feed mechanism G, then the third, and so on. From the last one of the series of viewing machines, the film travels over a roller $I^2$ back through the conduit B toward the storage-cabinet C. Over this same roller $I^2$ passes a band K, which is preferably endless and travels in the conduit B over supporting rollers L, toward the cabinet C, passing over a roller or pulley M mounted on a shaft N, up in the cabinet C, over roller O, mounted on shaft P, down over roller M', and then up and down in a spiral path over a number of rollers on the shafts N and P, then up to a roller Q, mounted on a shaft Q', down to a roller R, mounted on a shaft R', and up and down in a spiral path over a number of such rollers, Q, R, and finally out again into conduit C, in which it travels directly to roller $I^2$.

The film follows the band K along its lower run and through the cabinet C, but, on emerging therefrom and entering the conduit B, it separates from the band K and passes over roller I up into the viewing apparatus. Between the cabinet C and the first viewing apparatus, and also between the individual apparatuses, the film travels in the direction of the upper run of the band K, and may be in contact therewith, although this is not essential. The band K forms a backing or carrier for the film or series of pictures during its lower run and in the storage cabinet. The film H is, in the case illustrated, continuous or endless, although I might substitute for the storage cabinet C an endless film, one with the usual two-end reel.

The operation of my device is as follows: A coin dropped into the usual mechanism (not shown) of one of the viewing machines, will cause the shaft D to revolve by means of an electric or other motor (not shown), connected with said shaft. This will feed the film through all the viewing devices at the same time, although in the second device the beginning of the series of pictures will appear a little later than in the first device, in the third a little later than in the second, and so on, until the film has passed through all the viewing devices, whereupon it will again be wound into the storage cabinet, as described above. While by the starting of one device, the film will also be fed through all the devices of the series, the arrangement is preferably such that a coin must be dropped into each machine, in order to make the picture in the particular machine visible, by lighting up the lamp in such apparatus.

To load the storage or magazine housing, I proceed as follows: To the carrier band or belt K, I attach, say near the roller I², the forward end of the film; the belt is then set in motion, say by means of one of the shafts in the housing C, and the film follows the path of the carrier belt K, around the rollers or pulleys in the magazine housing. When the forward end of the film has reached the first roller I, it is detached from the belt or carrier, and, while the latter keeps moving, the film is threaded through the feeding device G of the first viewing apparatus, and then again attached to the belt K near the roller I'. As the forward end of the film, owing to the travel of the carrier belt K, reaches the second viewing cabinet, the same procedure is repeated, and so on, until the film reaches again a point near the roller I², where the film is cut off and the two ends are cemented together, so as to form a continuous, endless film.

To insure proper operation of the apparatus, it is necessary to synchronize the movement of the carrier belt with the speed of the feed device in the picture viewing cabinet, that is, to give the film in the apparatus and the carrier belt the same linear speed. This may be accomplished, if desired, by driving the carrier belt from the same shaft which operates the feed mechanism (say, by bevel gearing—not shown—operating one of the shafts in the storage housing, or otherwise.)

It will be obvious that instead of operating a series of viewing devices, only one such device might be connected with the storage cabinet or housing. Again, while I have shown my invention as applied to devices for viewing so called moving pictures, that is, pictures of a cinematographic series it may as well be used for displaying other pictures, say a series of independent pictures, arranged end to end in the form of a continuous band of pictures.

These and other modifications may be made without departing from the nature of my invention, as set forth in the appended claims.

I claim:

1. In apparatus of the class described, a cabinet provided with a sight opening for viewing successive pictures of an endless film, means for feeding said film through said cabinet, a storage housing for said film located outside of said cabinet, and a conduit between said housing and said cabinet through which the film travels from said storage housing to said cabinet, and vice versa.

2. In apparatus of the class described, a cabinet provided with a sight opening for viewing the successive pictures of an endless film, means for feeding said film through said cabinet, a storage housing for said film located outside of said cabinet, and an endless film-carrying belt traveling between said storage housing and said viewing cabinet.

3. In apparatus of the class described, a cabinet provided with a sight opening for viewing the successive pictures of an endless film, means for feeding said film through said cabinet, a storage housing for said film located outside of said cabinet, a plurality of pulleys arranged in said storage housing, a conduit between said housing and said cabinet through which the film travels from said storage housing to said cabinet, and an endless belt for carrying said film through said conduit and over the rollers of said storage housing.

4. In apparatus of the class described, a series of independent cabinets, each provided with a sight opening for viewing the successive pictures of a film, means for feeding said film successively through all the viewing cabinets of the series, and means for driving said feeding means in unison.

5. In apparatus of the class described, a storage housing for a band of successive pictures, a series of cabinets, each provided with sight openings for viewing the pictures, and means for passing said band from said housing successively through all the cabinets and then back to said housing.

In testimony whereof I affix my signature.

ALBERT F. SHORE.

Witnesses:
GEORGE A. HOFFMAN,
WARREN R. WEEKS.